US009440624B2

(12) United States Patent
Lewis

(10) Patent No.: US 9,440,624 B2
(45) Date of Patent: Sep. 13, 2016

(54) HYDRAULIC LIFT DEVICE FOR TRAILER

(71) Applicant: Milton R. Lewis, Lafayette, IN (US)

(72) Inventor: Milton R. Lewis, Lafayette, IN (US)

( * ) Notice: Subject to any disclaimer, the term of this patent is extended or adjusted under 35 U.S.C. 154(b) by 0 days.

(21) Appl. No.: 14/608,360

(22) Filed: Jan. 29, 2015

(65) Prior Publication Data

US 2016/0221546 A1 Aug. 4, 2016

(51) Int. Cl.
*B60S 9/12* (2006.01)
*B62D 53/06* (2006.01)

(52) U.S. Cl.
CPC ............... *B60S 9/12* (2013.01); *B62D 53/062* (2013.01); *B62D 53/065* (2013.01)

(58) Field of Classification Search
CPC .............. B60S 9/00; B60S 9/02; B60S 9/10; B60S 9/12; B62D 53/065
See application file for complete search history.

(56) References Cited

U.S. PATENT DOCUMENTS 2,590,210 A * 3/1952 Rogers ...................... B60S 9/12 280/441.2
2,676,783 A * 4/1954 Rogers ................. B62D 53/065 254/2 R
2,844,265 A * 7/1958 Clark .................. B62D 53/065 280/441.2
2,895,746 A * 7/1959 Swaney ............... B62D 53/065 254/420
2,934,230 A * 4/1960 Tracey ................. B62D 53/064 414/481
3,326,572 A 6/1967 Murray
3,532,362 A * 10/1970 Hippisley ............ B62D 53/062 280/441.2
3,561,732 A * 2/1971 Pulcini ................. B62D 53/065 254/423
3,578,356 A * 5/1971 Moiriat ................ B62D 53/065 280/441.2
3,756,443 A * 9/1973 Verschage ............ B62D 53/065 280/441.2
3,894,645 A * 7/1975 Verschage ............ B62D 53/065 280/441.2
4,421,286 A * 12/1983 Laky ......................... B64F 1/14 244/116
4,806,065 A * 2/1989 Holt ..................... B62D 53/065 280/425.2
5,125,679 A * 6/1992 Delano .................... B60D 1/66 248/291.1
5,217,209 A * 6/1993 Anders .............. B62D 53/0857 254/419
5,775,713 A * 7/1998 Peterson .............. B62D 53/065 280/425.2
6,378,887 B2 4/2002 Landoll et al.
8,752,854 B2 6/2014 Trowbridge et al.
2004/0104381 A1* 6/2004 Sharp ........................ B60S 9/12 254/423
2006/0104771 A1* 5/2006 Chapman .................. B60S 9/12 414/537
2012/0056407 A1 3/2012 Trowbridge et al.

OTHER PUBLICATIONS

"Two Hydraulic Trailer Jacks Kit", Web Page <http://www.premium-supply.com/categories/hydraulic-trailer-jacks/DoubleHydraulicJack> 1 page, Oct. 21, 2013, retrieved from Internet Archive Wayback Machine <https://web.archive.org/web/20131021221912/http://www.premium-supply.com/categories/hydraulic-trailer-jacks/DoubleHydraulicJack> on Mar. 10, 2016.*

* cited by examiner

*Primary Examiner* — Kevin Hurley
(74) *Attorney, Agent, or Firm* — Thomas D. Webster; TDW Patents & Consulting

(57) ABSTRACT

An easy-to-install, low cost hydraulic lift system and method for installation on a trailer with a removable gooseneck. The device reduces the number of steps required to manually connect and disconnect a trailer from an RGN thereby saving time and labor.

3 Claims, 5 Drawing Sheets

HYDRAULIC LIFT DEVICE FOR TRAILER

FIELD OF THE INVENTION

The present invention relates to trailers having a removable gooseneck and more particularly to a hydraulically operated lift device that simplifies disconnecting the trailer from a tractor.

BACKGROUND OF THE INVENTION

Transporting heavy loads overland is commonly accomplished by a tractor pulling a trailer laden with cargo. A variety of trailers are used for such purposes usually including an elongated deck and a plurality of wheels mounted near the rear end of the trailer for contact with the road during transportation. One particular type of heavy transport trailer is referred to as a "lowboy". Lowboy trailers include an elongated open deck having a front end which is lowered to the ground for loading and unloading heavy equipment on and off the trailer.

Trailers are usually pivotally-connected with a tractor, for example, by means of a removable gooseneck (RGN). An RGN connects at its front end to the fifth wheel assembly on the tractor and at the rear end with the deck of the trailer. U.S. Pat. No. 3,326,572 describes one type of detachable gooseneck.

Loading and unloading a lowboy trailer can be a daunting task when performed manually. A number of steps are required. First the RGN-trailer assembly is disconnected from the tractor by unlocking the fifth wheel, disconnecting electrical and air lines, discharging air in suspension to lower tractor (if applicable), and pulling the tractor forward slowly to lower the RGN-trailer assembly onto the ground. Next the RGN is disconnected from the trailer by removing "U" bars from locking plates to disconnect RGN from trailer on both sides, backing up the tractor so that the fifth wheel engages the RGN king pin, pulling the lock pin on the trailer to disengage RGN from trailer and pulling the tractor-RGN assembly away from trailer. This multi-step process may take 20-25 minutes or longer to perform manually. Reconnecting the trailer essentially involves the reverse of this process. Obviously this process is time-consuming and inefficient for businesses that are on a tight timeline. Moreover, this process can be even more burdensome during inclement weather.

While connecting and disconnecting a trailer from an RGN can be simplified by utilizing a hydraulic lift mechanism such systems can be very expensive to incorporate and add substantial weight to the operational load.

While currently available hydraulic lift devices provide an improvement over a strictly manual process for connecting and disconnecting a trailer from an RGN such systems are very costly to install. There remains a need for a less costly, easy-to-use hydraulic lift device for use when connecting and disconnecting an RGN from a trailer.

SUMMARY OF THE INVENTION

The present invention provides an easy-to-install, low cost hydraulic lift device, and method that reduces the time and labor required to couple and uncouple an RGN to a trailer such as a lowboy trailer when loading and unloading the trailer. The hydraulic device of the invention costs substantially less that the more expensive hydraulic lift systems currently available. The device of the invention includes at least one and preferably a plurality of hydraulically-activated cylinders or actuators mounted to the trailer deck frame on either side at the front end of the trailer such that activation of the cylinder(s) causes a piston to project in a downward direction to make contact with the ground, thereby providing support for the trailer and allowing easy uncoupling of the latching plates on the RGN from the trailer without having to go through additional, time-consuming manual manipulations usually required for manually executing the process.

Accordingly, it is an object of the present invention to provide a cost-effective hydraulically-activated trailer support device for use in supporting a trailer when coupling and uncoupling an RGN. The device can be retrofitted to an existing trailer lacking a hydraulic lift system, or installed on a new trailer as a desirable and cost-effective feature.

It is another object of the invention to provide an easy-to-use hydraulic lift device that reduces the number of steps required in manually disconnecting a trailer and RGN, enabling disconnection without first having to disconnect the RGN and tractor from the trailer, thereby saving time, labor, and money.

It is another object of the present invention to provide an easy-to-perform method for coupling and uncoupling an RGN and trailer using an hydraulic lift device of the invention.

These and other objects and advantages of the present invention will be apparent from the following description, the accompanying drawings, and the appended claims.

BRIEF DESCRIPTION OF THE DRAWINGS

Corresponding reference numbers indicate corresponding parts throughout the views of the drawings.

DETAILED DESCRIPTION OF PREFERRED EMBODIMENTS

Figure 1A:
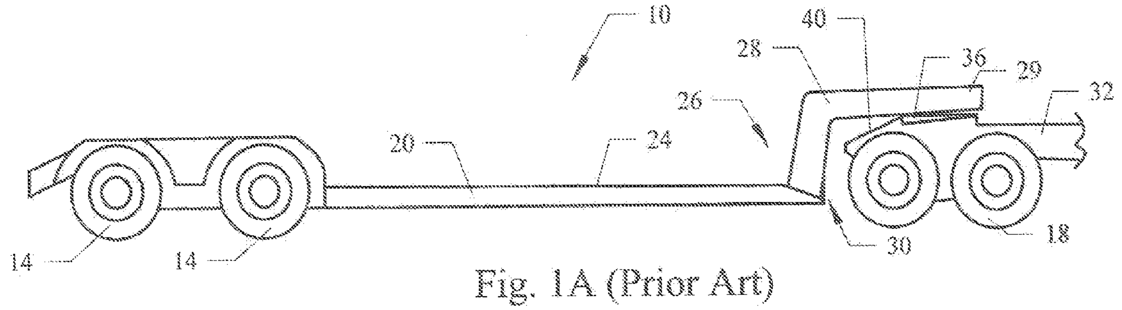
FIG. 1A is a side view of a typical RGN coupled with a lowboy trailer and tractor as known in the prior art.

As used herein, "actuator" refers to a component of a device of the invention for hydraulically lifting or supporting a trailer; in a preferred embodiment an actuator is a hydraulic cylinder.

As used herein the term “removable gooseneck” or “RGN” has its ordinary meaning and refers to a removable hitching device for connecting a tractor and trailer. An RGN may have a variety of shapes but generally has a more or less horizontally oriented arm that attaches to the fifth wheel at its front end and a more or less vertically oriented section at its rear that connects with the trailer.

As used herein the term “trailer” refers to its ordinary meaning as used in the trucking industry and the transportation of heavy loads. Generally a trailer is connected with a tractor or other pulling vehicle during operation but disconnected during loading and unloading. The term may refer to a specific type of trailer such as a lowboy trailer.

FIGS. 1A-1D provide a schematic representation of a typical prior art roadway transportation system 10 including a lowboy trailer connected with RGN and a tractor. The trailer includes an elongated deck 20, rear ground-engaging wheels 14, a deck frame 24, and front end 26. Also included is an RGN 28 which pivotally connects the deck 20 to a tractor 32 or other pulling vehicle. The RGN is connected to the deck by a coupling or latching assembly 30 and to the fifth wheel 36 of the pulling vehicle in the conventional manner.

Figure 1B:
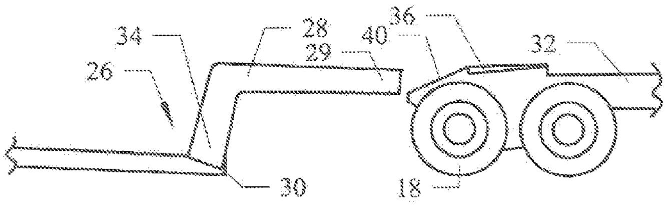
FIG. 1B provides a fragmentary view of the unit in FIG. 1A after uncoupling the RGN from the fifth wheel and lowering the RGN-trailer unit to the ground, as known in the prior art.
Figure 1C:
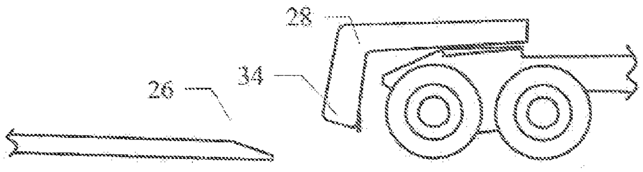
FIG. 1C shows the same view as in FIG. 1B after the RGN has been uncoupled from the trailer and reconnected with the tractor as known in the prior art.
Figure 1D:
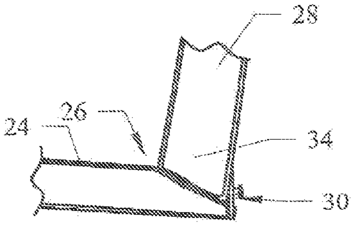
FIG. 1D shows an enlarged partial view of a connection between the RGN and trailer of FIG. 1B.

Generally, the RGN must be disconnected from the deck so that equipment can be loaded or unloaded from the trailer. To manually disconnect the trailer from the RGN, a multi-step, time-consuming process must be carried out. An example of this is illustrated in FIGS. 1B-1D. First the RGN-trailer assembly is disconnected from the fifth wheel 36 of the tractor; the tractor is then driven forward slowly so that the front end of the RGN-trailer assembly lowers to the ground. This can be accomplished, for example, by means of a shallow ramp 40 located at the rear of the tractor. With the trailer front end resting securely on the ground, the RGN and trailer deck can then be disconnected and the tractor and RGN re-coupled at the fifth wheel allowing the RGN-tractor unit to be pulled away from the trailer (FIG. 1B-1C). FIG. 1D illustrates a typical mechanical connection 30 joins the RGN and trailer (further detailed in FIG. 5A-5B). After the RGN has been disconnected from the trailer, the trailer can be loaded or unloaded as appropriate.

Re-connecting the RGN and tractor to the trailer involves reversing these steps. This process is very labor-intensive and time-consuming when performed manually and is especially burdensome if weather conditions are poor. Such delays are costly to trucking companies and operators.

While the following description details preferred embodiments of the present invention, and other aspects thereof, it is to be understood that the invention is not limited to the details of construction and arrangement of the parts illustrated in the drawings and description, since the invention is capable of other embodiments and of being practiced in various ways.

Figure 2:
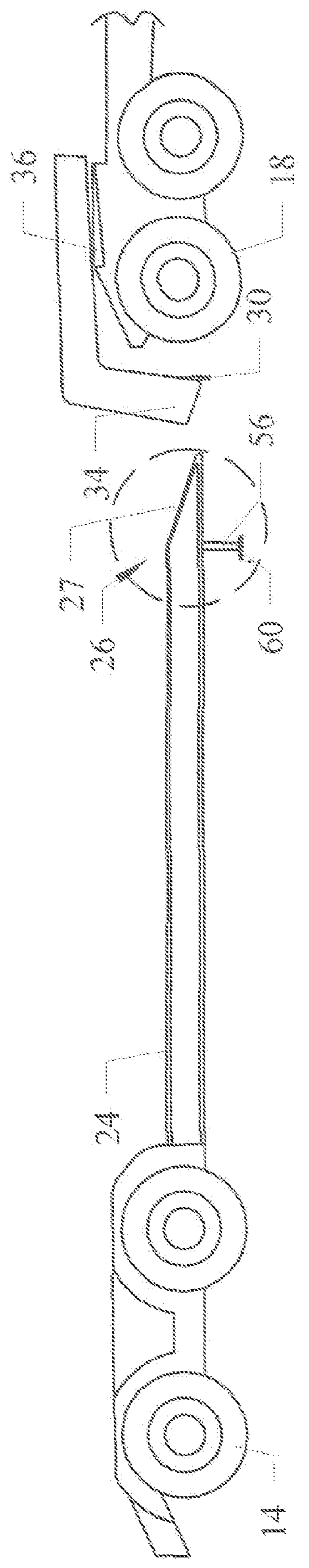
FIG. 2 shows a schematic representation of a lowboy trailer disconnected from the RGN-tractor unit being supported by a device of the invention mounted near the front end of the trailer.
Figure 3:
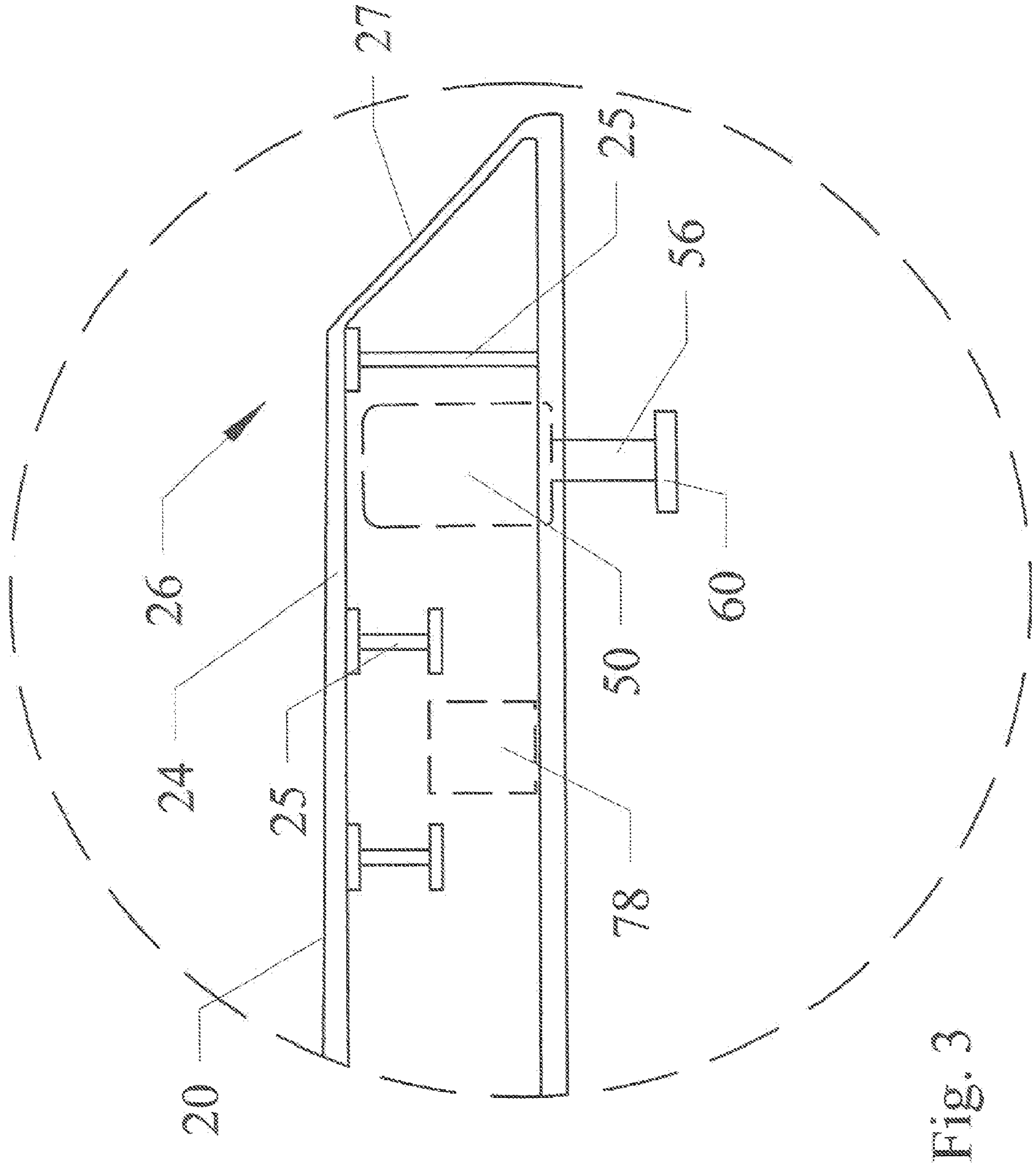
FIG. 3 shows an enlarged side view of a portion of FIG. 2 indicated by the dashed circle illustrating an embodiment of a device of the invention placed in operative position near the front end of a trailer.
Figure 4:
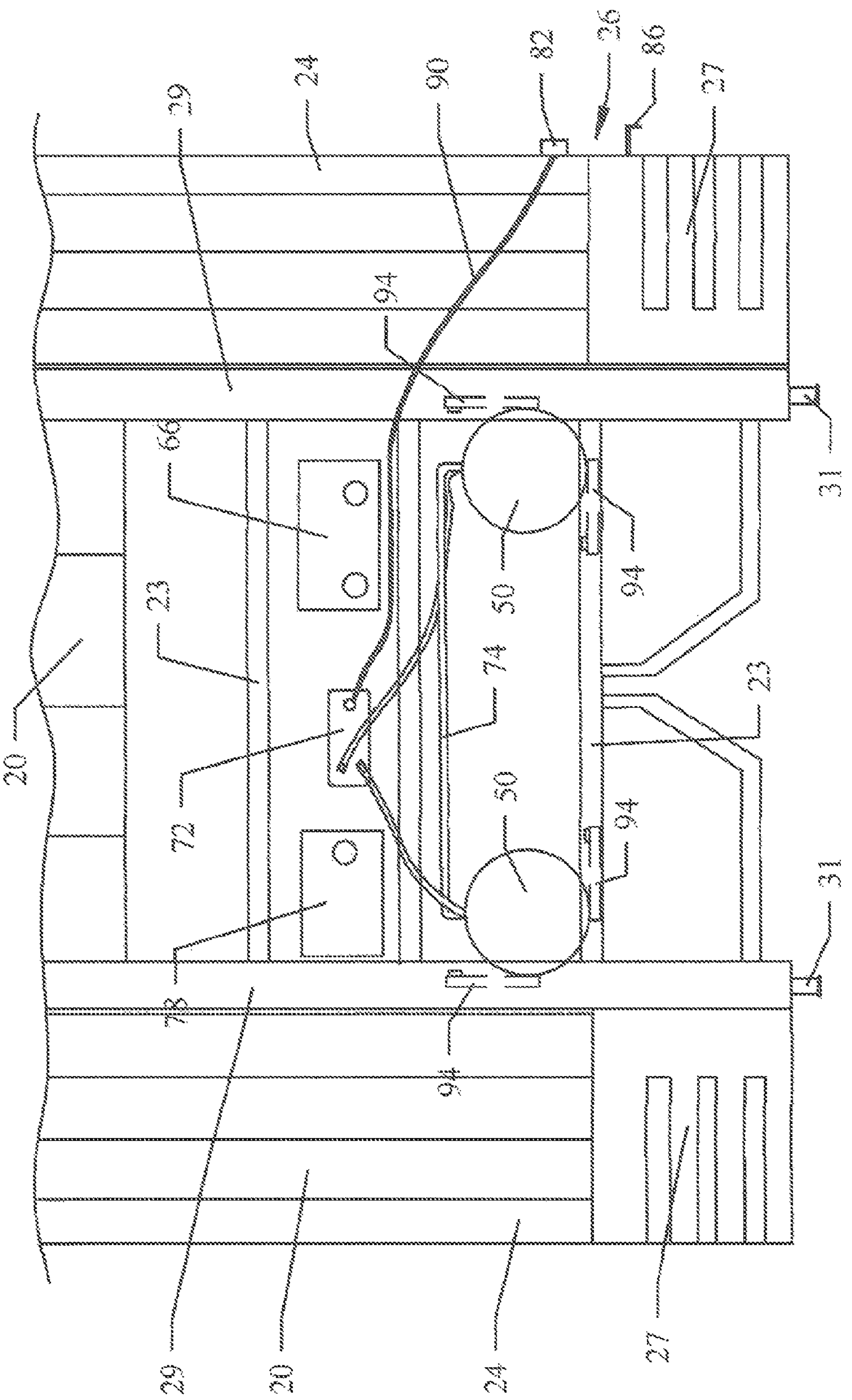
FIG. 4 provides a top perspective view of a portion of a lowboy trailer at the front end equipped with a hydraulic device of the invention.

A device of the invention includes at least one and preferably a plurality of hydraulic cylinders or actuators, for example, from two to six; most preferably the device includes two hydraulic cylinders. The hydraulic cylinders are operably-connected with a hydraulic pump, hydraulic reservoir, and suitable power supply. FIGS. 2-4 depict a preferred embodiment which will now be described in more detail. FIG. 2 shows some of the components of the device as operably attached to the front end 26 of a lowboy trailer. Illustrated are a hydraulically extendable cylinder member or arm 56 and foot member 60 which makes contact with the pavement or ground to support the front end of the trailer in preparation for connecting or disconnecting the trailer and RGN. Referring now to FIG. 3, provided is further detail of the trailer front end region indicated by the dashed circle in FIG. 2. In this preferred embodiment of the invention, two hydraulic cylinders 50 are mounted beneath the deck 20 of the trailer to portions of the frame which include I-beam support members 25 and longitudinal members 24. The device is mounted near the front end 26 of the trailer at any suitable place(s) which will provide adequate support to the front end, for example, just behind the front most I-beam support member 25, though it should be understood that other places and configurations of placement are contemplated to be within the scope of the invention. Only one cylinder is visible in this side view illustration; a second cylinder is located behind the one shown.

The hydraulic cylinders 50 include extension members or arms 56 which extend downward when activated to make contact with the ground. The end of each arm member 56 includes an actuator foot member 60 having a generally circular shape from 3 to 12 inches in diameter, preferably from 3 to 6 inches or from 3 to 8 inches inclusive. Also illustrated in FIG. 3 is a hydraulic fluid receptacle 78 for storing hydraulic fluid.

Referring now to FIG. 4, shown is a top schematic view of a preferred embodiment of a device of the invention installed near the front end of a lowboy trailer. The front end 26 includes a plurality of frame members including outer frame members 24 and inner frame members 29 and deck boards 20 which run parallel with the longitudinal axis of the trailer running front to back. The front end includes a downwardly extending ramp region 27 on each side of the trailer for loading and unloading cargo from the trailer deck. In this view it should be understood that the central region of the deck between inner frame members 29 is open, the decking boards 20 having been cut away to provide easy access for installation of the device though this step is not to be understood as necessary for installation.

Two hydraulically-activated cylinders 50 are mounted near the front end on each side of the trailer to frame members 24 by any suitable means known to the skilled artisan, for example, by means of brackets 94 that are welded to appropriate places on the frame members. For example, two or more brackets can be mounted to frame members that run parallel with the longitudinal axis of the trailer, and two or more brackets to a forwardly located cross frame member 23, as illustrated in FIG. 4. It should be understood that the invention is not intended to be limited to any particular method for mounting the cylinders or to any particular location or configuration for the placement of cylinders or other components of the invention, and other placements and configurations are contemplated so long as the front end of the trailer can be safely supported.

As further illustrated in FIG. 4, a device of the invention also includes a hydraulic fluid receptacle 78, hydraulic pump 72 and power supply 66, for example, a 12 volt battery or other suitable power supply. Alternatively, the device could be powered by connection to the electric plug or line coming from the tractor.

Hydraulic cylinders 50 may be of any suitable type sufficiently rated to support the trailer, for example, about 20-50 or more ton per cylinder; preferably about 35 ton per cylinder or higher where appropriate for the particular trailer. The cylinders may, but not necessarily will, be about 8-15 inches long from top to bottom, having extendable piston or leg members which, when extended, reach a length sufficient to raise the trailer to a level desired, for example, such that the trailer is level with the ground or somewhat higher than level at the front end of the trailer. The extendable piston may extend the length of the cylinders up to 14 inches. As would be appreciated by the skilled artisan, the component parts of the device are connected by conventional means such as valves, couplers, hoses and/or other lines 74 to transport power to the pump and fluid from the pump to the cylinders and back.

Also illustrated in FIG. 4 is a switch 82 and switch wire 90 to activate the pump; here the switch is located near the front end of the trailer near the RGN release pin 86 but could be located elsewhere as would be known to the skilled artisan.

Figure 5A:
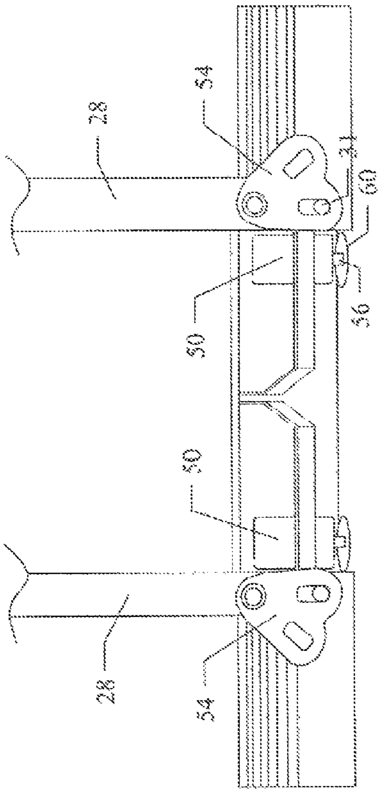
FIG. 5A provides a front view of a lowboy trailer equipped with a device of the invention with the latching plates of the RGN connected with the link pin on the trailer.
Figure 5B:
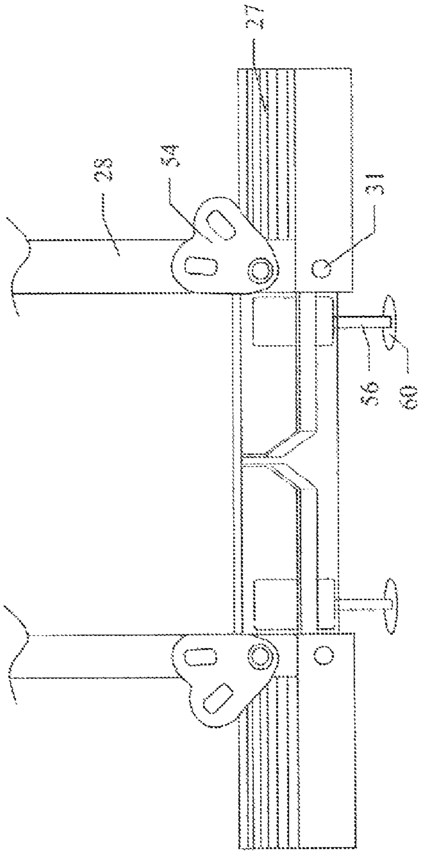
FIG. 5B shows the latching plates disconnected from the link pins on the trailer.

Referring now to FIGS. 5A and 5B use of the device shall now be described. The device of the invention reduces substantially the time required for an operator to connect and disconnect an RGN from a trailer in comparison with manual disconnection. Therefore, in another embodiment the present invention relates to a method for hydraulically supporting a trailer, for example, a lowboy trailer to enable connecting or disconnecting the trailer from an RGN without having to first disconnect the RGN from the tractor, lower the trailer to the ground and then reconnecting the RGN and trailer so that the trailer can be loaded or unloaded.

For purposes of describing the advantages of the present method a typical mechanical detachment process shall be described. Initially the operator sets the brakes then pulls $5^{th}$ wheel pin; removes air and electrical lines between the tractor and trailer; dumps the air in the tractor; drives the tractor forward; gets under the trailer and removes the D ring; removes additional air lines between the front and main part of trailer; gets back in the tractor; hooks up the $5^{th}$ wheel; installs a 4×4 board into the $5^{th}$ wheel; pulls the safety latch on the trailer; gets into the truck; reinstalls air to the tractor which raises the front end of the trailer; and drives out.

FIG. 5 A shows a portion of the rear end of an RGN frame 28 mounted to the front end of a trailer. The RGN includes latching plates 54 on each side that operably-connect with link pins 31 on the front end of the trailer thereby coupling the RGN and trailer.

Applying the method of the invention, an operator sets the brake; dumps air from the tractor; extends the cylinders; detaches D rings; removes air and electrical lines between front and main part of trailer; pulls the safety lock on trailer; inserts 4×4 board behind the $5^{th}$ wheel to carry front half of the trailer; gets in the tractor; re-airs; releases the tractor brake; and drives forward to detach from the trailer. After detachment the operator raises the cylinders to lower the trailer to the ground for loading. This simplified process saves the operator time and labor.

A device of the invention can be installed as a retrofit to any suitable trailer, for example, a lowboy trailer not otherwise equipped with a hydraulic lift system. Referring to the drawings and description herein, it is within the level of skill in the art to install the device using known methods and tools. Alternatively, a device of the invention could be installed to a new trailer as a desirable alternative to the substantially more costly and complex hydraulic lift systems that currently exist.

In another aspect the present invention relates to a kit for retrofitting a trailer without a suitable hydraulic lift system with one or more components of a device of the invention. In one embodiment a kit includes a device of the invention. In another embodiment a kit may include any one or more of the following components: 1, 2, 3, 4 or more hydraulic cylinders suitably rated to provide adequate support for a particular trailer considering its size and weight (e.g. 35 ton load capacity, or higher or lower as needed), mounting brackets, a hydraulic fluid pump, hydraulic fluid receptacle, connection lines and wires to interconnect the components, and a switch to activate the system. The components of the kit may be installed on a trailer not already equipped with a hydraulic system at a fraction of the cost to install a complex hydraulic system. The kit also includes instructions for installing the device, placement of the cylinder(s) on the trailer, mounting means including mounting with brackets, welding, and instructions for connecting and disconnecting a trailer equipped with a device of the invention.

While the form of the device herein described constitutes a preferred embodiment of the invention, it should be understood that the invention is not limited to the precise from of apparatus or device, and that changes may be made therein without departing from the scope of the invention.

What is claimed is:

1. A hydraulically-activated device for supporting a trailer having rear ground-engaging wheels, a deck a forward end, a back end, and a support frame comprising:

a) two hydraulic cylinders mounted to one or more frame members at the forward end of the trailer said cylinders being laterally spaced apart from each other perpendicular to a center longitudinal axis extending from the forward to back end of the trailer, each cylinder having an extendable arm member and a foot member at the end of each arm member, the cylinder being actuable to extend the arm members in a downward direction so that the foot members make contact with a surface on which the trailer ground-engaging wheels rest to provide support thereto;

b) a hydraulic pump for pumping hydraulic fluid to and from the cylinders;

c) a hydraulic fluid receptacle for storing hydraulic fluid;

d) a power supply to activate the pump; and e) a switch or other means to activate the device wherein said trailer is a lowboy trailer further comprising a removable gooseneck having forward and back ends, latching plates on the back end of the gooseneck and link pins on the forward end of the trailer for coupling and uncoupling the gooseneck and trailer, and a pulling vehicle pivotally connected with the forward end of the gooseneck wherein when the trailer, gooseneck and pulling vehicle are connected said latching plates and link pins are interlinked in a locked and force-bearing position and wherein said cylinders are mounted beneath the deck.

2. A device as in claim 1 wherein said frame members include an outer frame member and an inner frame member at the right side of the trailer and left side of the trailer extending parallel with said center longitudinal axis wherein one of said cylinders is mounted to the inner frame member on the right side and the other cylinder is mounted to the inner frame member on the left side.

3. A device as in claim 2 said frame members further including a cross fame member having an axis perpendicular to said longitudinal axis, extending between said inner frame member at the right side of the trailer and left side of the trailer said cylinders being further mourned to said cross frame member.

* * * * *